United States Patent [19]

McLaurin

[11] 4,310,167

[45] Jan. 12, 1982

[54] CENTER OF GRAVITY WHEELCHAIR WITH ARTICULATED CHASSIS

[75] Inventor: Colin A. McLaurin, Charlottesville, Va.

[73] Assignee: The University of Virginia Alumni Patents Foundation, Charlottesville, Va.

[21] Appl. No.: 150,148

[22] Filed: May 15, 1980

[51] Int. Cl.³ .......................... B62B 9/02; B62M 1/00
[52] U.S. Cl. ................................. 280/5.28; 280/47.16; 280/242 WC
[58] Field of Search ....................... 280/5.2, 5.28, 5.32, 280/242 WC, 211, 47.16; 180/209, DIG. 3; 297/DIG. 4, 316, 327

[56] References Cited

U.S. PATENT DOCUMENTS

| | | | |
|---|---|---|---|
| 2,285,699 | 6/1942 | Everest et al. | 280/47.16 |
| 2,986,200 | 5/1961 | Nobile | 297/327 |
| 3,104,112 | 7/1963 | Crail | 280/211 |
| 3,191,990 | 6/1965 | Rugg et al. | 297/316 |
| 3,580,591 | 5/1971 | Coffey | 280/5.32 |
| 3,848,883 | 11/1974 | Breacain | 280/5.32 |
| 3,901,527 | 8/1975 | Danziger et al. | 280/211 |
| 3,953,054 | 4/1976 | Udden et al. | 280/242 WC |
| 4,108,449 | 8/1978 | Rhodes | 280/5.28 |
| 4,245,847 | 1/1981 | Knott | 280/5.2 |

*Primary Examiner*—Joseph F. Peters, Jr.
*Assistant Examiner*—Donn McGiehan
*Attorney, Agent, or Firm*—Oblon, Fisher, Spivak, McClelland & Maier

[57] ABSTRACT

A center of gravity wheelchair with an articulated chassis front and rear caster wheels, in which the main wheels and front and rear caster wheels are arranged in a diamond pattern, and the main wheels and rear caster wheel are carried by a subframe to form a bogie system, with the seat and front caster wheel carried by a seat frame assembly articulated with respect to the subframe through a pivoted link arrangement, whereby the seat may be moved forward relative to the main wheels, with a spring and damper connected between the subframe and seat frame assembly to minimize the tendancy for the front caster wheel to lift off the ground when the main wheels are strongly propelled and to provide a shock absorbing structure for traversing rough ground. The diamond pattern provided by the wheels prevents lateral drift of the wheel chair when traversing sloping surfaces, and the articulated frame permits easier curb climbing.

8 Claims, 5 Drawing Figures

CENTER OF GRAVITY WHEELCHAIR WITH ARTICULATED CHASSIS

BACKGROUND OF THE INVENTION

1. Field of the Invention

This invention relates generally to wheelchairs, and more particularly to a wheelchair of the type in which the main wheels are located essentially under the center of gravity. Such wheelchairs are generally referred to as center of gravity wheelchairs. The present invention further relates to such wheelchairs having an articulated chassis whereby the seat and thus the center of gravity may be moved forwardly relative to the main wheels, thereby increasing the stability and facilitating curb climbiing. Moreover, the articulated chassis enables the rider to tilt backwards thereby achieving a change in postural support. Further, the wheelchair of the invention has caster wheels fore and aft thereof arranged in a diamond pattern with the main wheels so that lateral side drift of the wheelchair is minimized when traversing sloping surfaces.

2. Prior Art

Many different wheelchair designs are known in the prior art, including so called center of gravity wheelchairs and wheelchairs having articulated chassis and fore and aft caster wheels. Some prior art wheelchairs even have lever operated front and rear caster wheels which can be lifted to facilitate curb climbing. Other wheelchair designs have small wheels projecting fore and aft and supported on arms restrained by springs whereby the user is enabled to safely tilt back.

Examples of some of these prior art wheelchair designs are shown in U.S. Pat. Nos. 2,986,200, 3,104,112, 3,191,990, 3,580,591, 3,901,527, 3,953,054 and 4,108,449.

While these prior art wheelchair designs do provide certain advantages over conventional rigid frame wheelchairs having only a pair of main wheels and a pair of casters in front, these prior art designs possess several disadvantages. For example, wheelchairs having either front caster wheels or rear caster wheels exhibit a strong tendency to turn sideways when being propelled on a side-sloping surface. The energy for maintaining a straight course under these conditions often exceeds the energy required to propel the chair and is a serious concern for street users. Center of gravity wheelchairs such as those described herein overcome this difficulty, but have other problems. For instance, in one design with an articulated chassis, the chassis did not articulate automatically and hence all four wheels did not contact the ground under all conditions. This condition leads to instability with one main wheel off the ground. Other designs have articulated chassis constructed such that when the hand rims or main wheels are propelled the chair tilts back and forth with each stroke. Other chairs overcome these difficulties but have small caster wheels making them unsuitable for outside use. Another major disadvantage of conventional center of gravity wheelchairs is that they are difficult to force up over curbs because of the amount of weight immediately over the main wheels.

SUMMARY OF THE INVENTION

Therefore, the present invention has for its principal object the design of a wheelchair which can traverse sloping surfaces without experiencing side drift and yet which may be easily manipulated to climb curbs and the like and which may traverse rough ground without undue discomfort to the user.

Another object of the invention is to provide a wheelchair design which facilitates traversing of gaps such as the gap occurring between a train and platform in a subway or the like.

A still further object of the invention is to provide a center of gravity wheelchair in which the seat and thus the center of gravity is located essentially over the main wheels during normal use but in which means is provided for easily shifting the seat and center of gravity forwardly to remove weight from the main wheels to facilitate curb climbing.

Another object of the invention is to provide such a wheelchair in which the articulated chassis has spring means and damper means connecting the chassis components to retain front and rear caster wheels on the ground even when the main wheels are strongly propelled and which absorbs shocks when the wheelchair is caused to traverse rough ground or to descend curbs and the like.

Yet another object of the invention is to provide a center of gravity wheelchair having a pair of main wheels located essentially under the center of gravity and with front and rear caster wheels carried by separate chassis or frame portions articulated relative to one another and constructed to permit a safe "wheelie" position.

These and other objects and advantages of the invention are attained by providing a subframe or bogie assembly which carries the main wheels and a rear caster wheel and a seat frame assembly movably joined to the subframe assembly for articulation relative thereto and carrying the seat and a front caster wheel. The subframe and seat frame assembly are interconnected by spring means and damper means which resiliently holds all of the wheels on the ground during use and which provides shock absorption when the chair traverses rough ground or descends a curb and the like. A hand operated linkage arrangement is connected between the subframe and seat frame assembly for easily manually shifting the seat and seat frame assembly forwardly relative to the subframe and main wheels so that the center of gravity of the chair is moved forwardly of the main wheels to lighten the weight thereon and facilitate curb climbing.

BRIEF DESCTIPTION OF THE DRAWINGS

Various other objects, features and attendant advantages of the present invention will be fully appreciated as the same become better understood from the following detailed description when considered in connection with the accompanying drawings in which like reference numerals designate like or corresponding parts throughout the several views, and wherein:

FIG. 5 is a perspective view of the hand operated link arrangement for manipulating the seat frame assembly of the wheelchair of the invention.

DETAILED DESCRIPTION OF THE PREFERRED EMBODIMENTS

Figure 1:
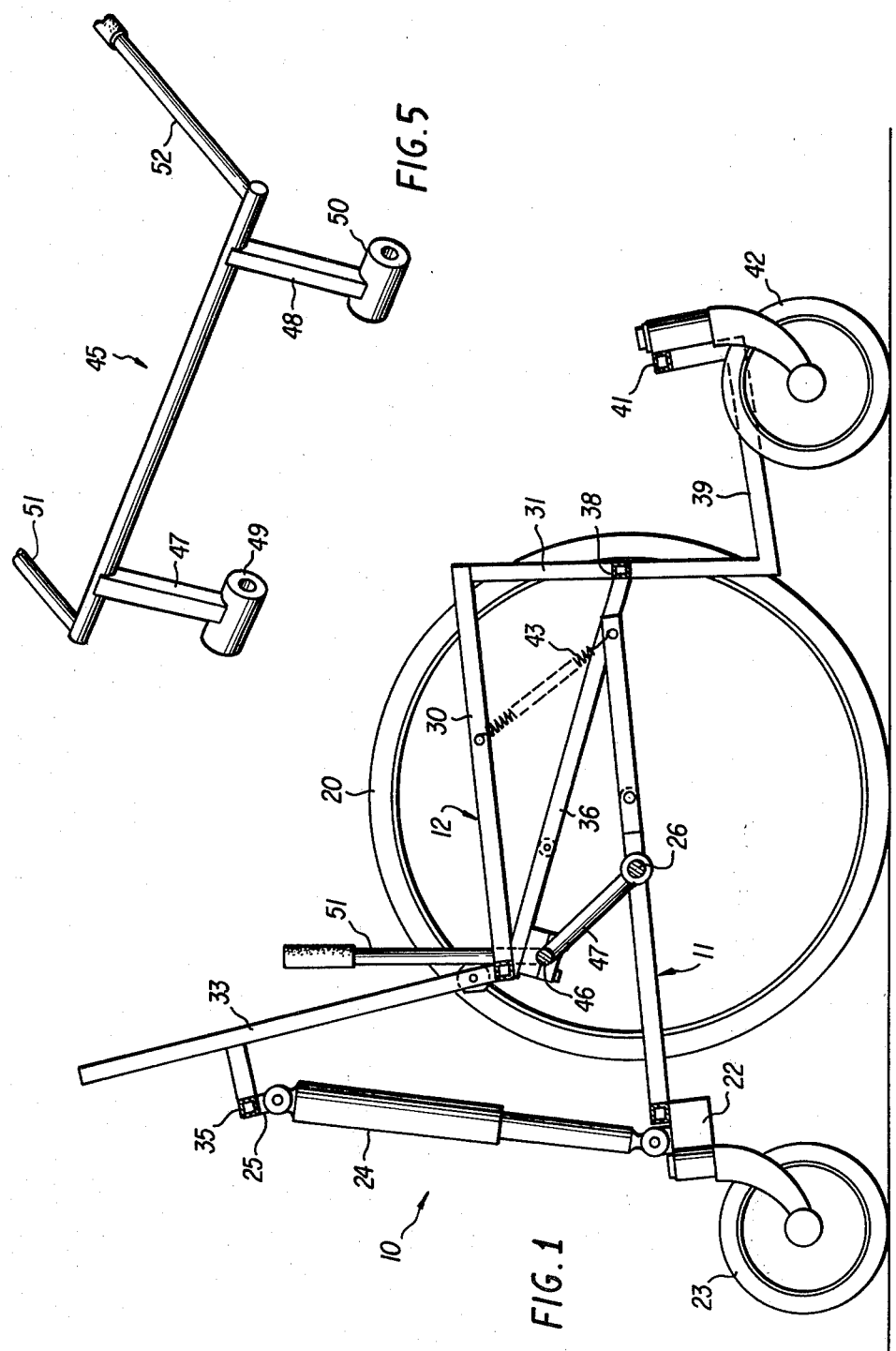
FIG. 1 is a sectional view in side elevation of the wheelchair of the invention showing the seat and seat frame assembly in the normal position with the center of gravity positioned essentially over the main wheels.

The wheelchair of the invention is indicated generally at 10 and comprises an articulated chassis including a subframe or bogie assembly 11 and a seat frame assembly 12 connected therewith for articulation relative thereto.

The subframe 11 comprises a rearwardly extending wishbone or generally V-shaped suspension member 13 with a pair of rearwardly converging arms 14 and 15 having generally parallel forwardly extending portions 16 and 17 at their forward ends with outwardly projecting stub shafts or axles 18 and 19 thereon for supporting the main wheels 20 and 21 of the wheelchair. A bracket 22 is secured to the rearward end of the converging arms 14 and 15 and a rear caster wheel 23 is connected thereto. Also, a shock absorber 24 is connected at one end to the bracket 22 and extends upwardly therefrom to a bracket 25 carried by the back of the seat frame assembly. A cross bar 26 is connected at its opposite ends to the forwardly extending portions 16 and 17 of the wishbone 13 and is positioned just rearwardly of the axles 18 and 19 for the main wheels. A pair of spring arms or brackets 27 and 28 are fixed to the forward ends of arms 16 and 17 and extend forwardly therefrom a distance approximately as far forwardly of the cross bar 26 as the rear caster wheel bracket support 22 is spaced rearwardly from the cross bar.

The seat frame assembly 12 comprises a pair of generally horizontal parallel seat side frame rails or members 29 and 30 with a pair of depending front frame members 31 and 32 extending downwardly from the forward ends thereof, and a pair of upwardly extending back side frame rails or members 33 and 34 extending upwardly from the rearward ends thereof. A cross brace 35 extends between the back side frame members 33 and 34 adjacent the upper ends thereof and the shock absorber bracket 25 is carried thereby at approximately the mid portion thereof.

A pair of downwardly and forwardly extending frame braces 36 and 37 extend from a point adjacent the juncture of the back and seat frame members to a point approximately midway between the top and bottom ends of the front frame members 31 and 32. A cross frame brace 38 extends laterally across the space between the front frame members 31 and 32 at the juncture of the diagonal frame braces 36 and 37 therewith.

A pair of forwardly extending suspension arms 39 and 40 project forwardly from the lower ends of front frame members 31 and 32 and a cross arm 41 extends laterally between the forward ends of suspension arms 39 and 40. A forward caster wheel 42 is carried by the cross arm 41 at a point approximately midway between the ends thereof.

A pair of springs 43 and 44 are connected between the forward ends of spring arms 27 and 28 and the seat side frame members or rails 29 and 30 at a point slightly forward of the mid portion of the frame members 29 and 30.

Figure 2:
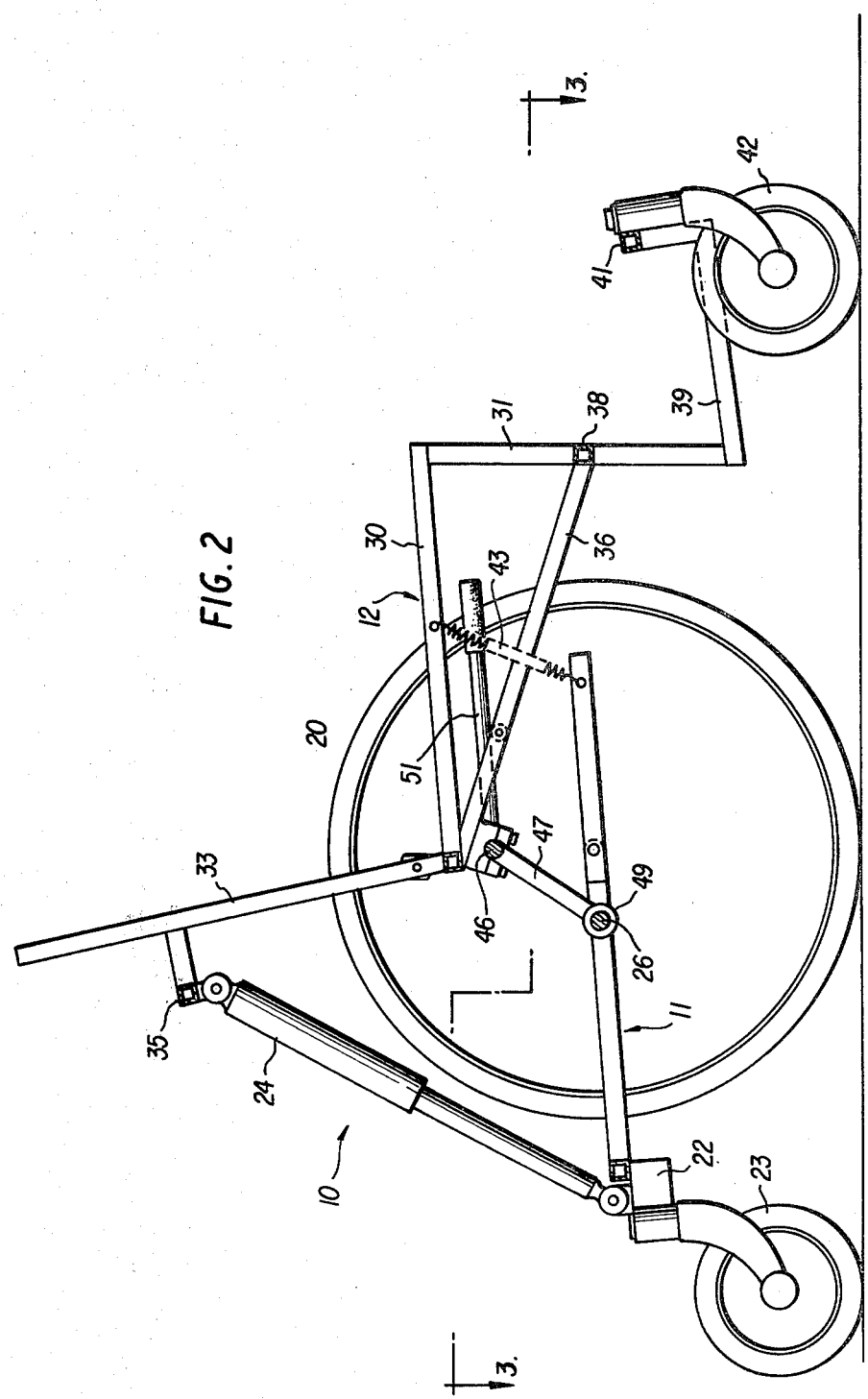
FIG. 2 is a view similar to FIG. 1 showing the seat frame assembly shifted forwardly to position the center of gravity forwardly of the main wheels.
Figure 3:
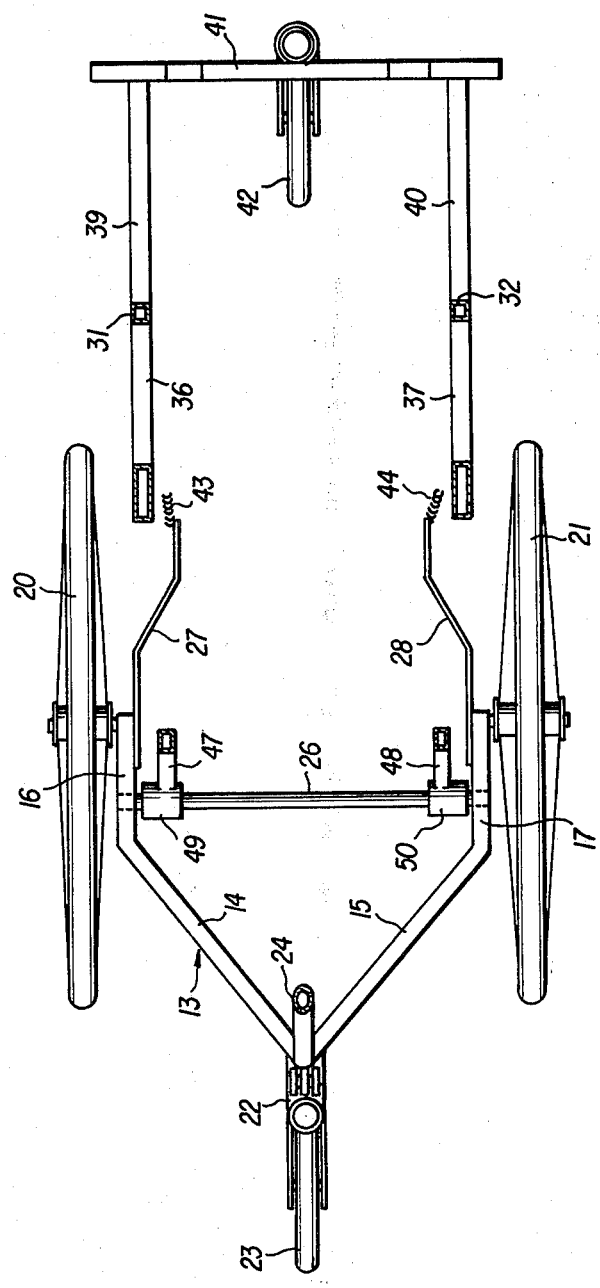
FIG. 3 is a horizontal sectional view taken along line 3—3 in FIG. 2.
Figure 4:
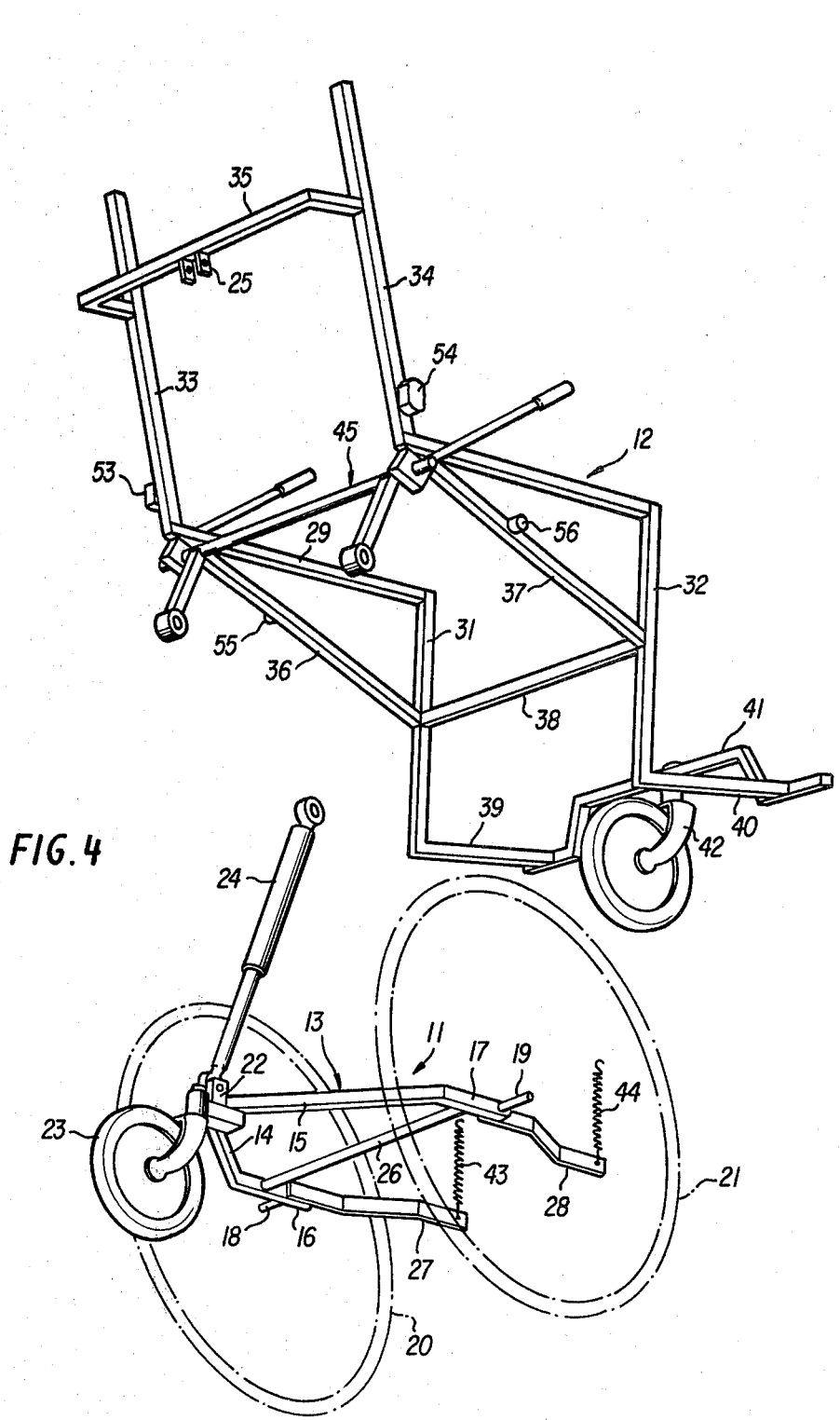
FIG. 4 is an exploded perspective view from below of the subframe and seat frame assembly of the invention, with the seat removed for clarity.

A pivoted link assembly 45 comprises a cross bar 46 having a pair of depending pivot links or arms 47 and 48 thereon near the opposite ends thereof with bearing journals 49 and 50 at the lower ends thereof received on the cross bar 26 of the subframe 11. A pair of operating levers or handles 51 and 52 are carried by the cross bar 46 at its opposite ends for manual manipulation of the levers to rotate the pivot arms 47 and 48 about the cross bar 26 to cause the seat frame assembly 12 to move either forwardly, as seen in FIG. 2, or rearwardly as seen in FIG. 1. The pivoted link assembly 45 has an overcenter action such that in cooperation with the springs 43 and 44 the seat frame assembly is in a stable condition in either its forward or rearward positions.

A pair of stops 53 and 54 are provided on the back side frame members 33 and 34 adjacent their lower ends for cooperation with the handles or levers 51 and 52 to limit further rearward movement of the handles when the seat frame assembly is in its rearward position. Similarly, a pair of stops 55 and 56 are provided on the diagonal frame braces 36 and 37 for limiting forward travel of the levers when the seat frame assembly 12 is in its forward position. The shock absorber 24 and springs 43 and 44 securely and positively maintain the subframe and seat frame assembly in a predetermined relationship but yet permit the subframe and seat frame assembly to articulate relative to one another for increased comfort when traversing rough ground. Moreover, the seat frame assembly may be tilted rearwardly into a "wheelie" position without any danger of upsetting the wheelchair.

The components of the frame are manufactured from any suitable material such as tubular steel or the like.

Any suitable seat and backrest structure and material may be used, and the chair may be either motor or hand propelled.

With the wheelchair of the invention, there is little or no tendency to drift sideways when traversing a sloping surface, and the turning radius of the wheelchair is less than that of conventional wheelchairs. Moreover, the wheelchair can be tipped backwards to a passive "wheelie" position, enabling a change in postural support and also permitting the front caster wheel to be elevated onto a curb. Gaps between platforms and trains can be easily traversed, and relatively high curbs can be descended front first without difficulty.

Obviously, numerous modifications and variations of the present invention are possible in light of the above disclosure. It is therefore to be understood that within the scope of the appended claims the invention may be practiced otherwise than as specifically described herein.

What is claimed as new and desired to be secured by Letters Patent of the United States is:

1. A center of gravity wheelchair, comprising:
   an articulated chassis having a subframe to which is mounted a pair of main wheels and a rear caster wheel, and a seat frame assembly carrying a seat and a front caster wheel and connected to the subframe for movement relative thereto between a first position with the seat positioned over the main wheels and a second position forwardly of the main wheels to facilitate curb climbing;
   said main wheels and front and rear caster wheels being arranged in a diamond pattern whereby lateral drift of the wheelchair is minimized while traversing sloping surfaces; and
   resiliently yieldable means connected between the subframe and seat frame assembly to minimize the tendency for the front caster wheel to lift off the ground when the main wheels are strongly propelled, and to provide shock absorption when traversing rough ground.

2. A wheelchair as in claim 1, wherein:
a hand operated means is connected between the subframe and seat frame assembly for manually shifting the seat frame assembly forwardly and rearwardly relative to the subframe.

3. A wheelchair as in claim 2, wherein:
the hand operated means comprises a pivoted link arrangement with a pair of pivot arms pivotally supported at one of their ends on a cross bar in the subframe and connected at their other ends to the seat frame assembly adjacent the rear thereof, and an operating lever rigidly connected with the upper ends of the pivot arms to cause them to pivot forwardly or rearwardly about the cross bar when the lever is manipulated.

4. A wheelchair as in claim 1 or 2 or 3, wherein:
the subframe is generally wishbone shaped and has a pair of rearwardly converging members with a pair of laterally spaced, generally parallel forwardly extending members on the forward ends of the rearwardly converging members;

axes for the main wheels being provided on the parallel, forwardly extending members;

a pair of forwardly extending spring arms on the forward ends of the forwardly extending members projecting forwardly under the seat frame assembly;

a pair of springs connected between the forward ends of the spring arms and the seat frame assembly; and a shock absorber connected between the rearward ends of the rearwardly converging members and an upper portion of a seat back of the seat frame assembly.

5. A wheelchair as in claim 4, wherein:
the seat frame assembly comprises a pair of generally parallel, substantially horizontal seat side frame members with a pair of depending front frame members at the forward ends thereof and a pair of spaced apart, upwardly extending seat back frame members at the rear ends thereof;

a pair of forwardly extending suspension arms at the lower ends of the front frame members and a cross arm extending between the forward ends thereof, said front caster wheels being supported on the cross arm at approximately the mid portion thereof.

6. A wheelchair as in claim 5, wherein:
a pair of stops are on the seat frame assembly back frame members to limit rearward movement of the lever when the seat frame assembly is in its rearward position.

7. A wheelchair as in claim 6, wherein:
a pair of diagonal frame braces extend between the seat side frame members at their rear ends and the front frame members; and a pair of stops are on the diagonal frame braces in a position to engage and limit forward movement of the lever when the seat frame assembly is in its forward position.

8. A wheelchair as in claim 7, wherein:
said pivoted link arrangement includes a cross bar fixedly connected to and extending between the upper ends of the pivot arms, and a hand operated lever fixedly secured to each of the opposite ends of the cross bar in a position to be gripped and manipulated by a user of the wheelchair; and means securing said cross bar to the seat frame assembly at the juncture of the seat side frame members and the seat back frame members.

* * * * *